United States Patent [19]

Suzuki

[11] Patent Number: 4,759,012
[45] Date of Patent: Jul. 19, 1988

[54] TIME DIVISION SWITCHING SYSTEM

[75] Inventor: Shigefusa Suzuki, Saitama, Japan

[73] Assignee: Nippon Telegraph and Telephone Corporation, Tokyo, Japan

[21] Appl. No.: 939,770

[22] PCT Filed: Mar. 6, 1986

[86] PCT No.: PCT/JP86/00114

§ 371 Date: Nov. 6, 1986

§ 102(e) Date: Nov. 6, 1986

[87] PCT Pub. No.: WO86/05349

PCT Pub. Date: Sep. 12, 1986

[30] Foreign Application Priority Data

Mar. 8, 1985 [JP] Japan .................................. 60-46165

[51] Int. Cl.$^4$ ............................................. H04Q 11/04
[52] U.S. Cl. ........................................... 370/66; 370/68
[58] Field of Search ...................... 370/66, 68, 104, 58

[56] References Cited

U.S. PATENT DOCUMENTS

| | | | |
|---|---|---|---|
| 3,967,070 | 6/1976 | Srivastava et al. | 370/66 |
| 4,467,471 | 8/1984 | Troost | 370/66 |
| 4,470,139 | 9/1984 | Munter | 370/66 |
| 4,471,479 | 9/1984 | Waas | 370/66 |
| 4,510,597 | 4/1985 | Lewis | 370/66 |

FOREIGN PATENT DOCUMENTS 43-27246 11/1968 Japan .
59-171093 9/1984 Japan .

Primary Examiner—Douglas W. Olms
Attorney, Agent, or Firm—Cushman, Darby & Cushman

[57] ABSTRACT

A time sharing switching system capable of changing channel allocation, comprising a time switch (6), two channel conversion memories ($11_1$) and ($11_2$) for storing read and write addresses of the time switch (6), and two address control memories ($10_1$) and ($10_2$) for storing write addresses of the channel conversion memories ($11_1$) and ($11_2$). The two channel conversion memories (11) and ($11_2$) are alternately used for each frame. After communication data of a previous frame is read from the address of the time switch (6) designated by the channel conversion memory ($11_2$), communication data of a present frame is written into the address. By writing this address in the other channel conversion memory ($11_1$), of which the address is designated by the address control memory ($10_1$), the read and write addresses of the time switch (6) of the next frame are stored. To change the channel allocation, a new channel allocation is written into the other address control memory ($10_2$) so that the address control memory ($10_2$) is used. The amount of memory can be decreased as a whole, and the delay of the signal can be decreased.

2 Claims, 15 Drawing Sheets (1) Initial Set (2) Transferring Con ial view of a prior art channel
TIME DIVISION SWITCHING SYSTEM

FIELD OF THE INVENTION

This invention relates to a time division switching system which is capable of reallocation of channels, and more particularly to a time division switching system of which hardware is compact in size and which can reduce delay within the switching system. This system is suitable to be carried on a satellite.

BACKGROUND OF THE INVENTION

An example of a prior art time division switching system is described referring to FIGS. 4 through 6. FIG. 4 is an explanatory view of a system for carrying a time division switching system on a satellite. The blocks (of a plural number) 1,2,3 at the bottom of the figure represent ground stations installed on the earth, and a block 30 at the top of the figure represents a facility installed on a satellite. When a ground station $1_1$ wishes to call another ground station $1_2$ through a communication channel, switching is controlled as in the following process. A call originating signal from the ground station $1_1$ is transmitted to a channel allocation control station 2 and a switching control station 3 via a terrestrial common channel signal network. The channel allocation control station 2 hunts for idle channels in the uplink U between the ground station $1_1$ and the satellite 30 and the downlink D between the ground station $1_2$ and the satellite 30 as soon as it receives the call originating signal, and it sends the data to the ground stations $1_1$ and $1_2$ via terrestrial common channel signal network 25 and to the satellite 30 via a satellite channel. The switching control station 3 sends to a switching control circuit 8 the time switching control data for alternately connecting the channels hunted for in the uplink U and the downlink D. Consequently, a time switch 6 connects the channels between the uplink U and the downlink D. The ground station $1_1$ transmits data to the satellite 30 by using an allocated channel of the uplink U while the ground station $1_2$ receives the data via an allocated channel of the downlink D.

FIG. 5 shows a frame structure of the uplink U. The data transmitted from respective ground stations $1_1$ through $1_n$ are united in a unit of plural channels and added to a preamble P for synchronized control of data at the top thereof to form a traffic burst for each of the ground stations. FIG. 5 shows the states of traffic bursts when they are being transmitted to the uplink U, led by preamble P at the top and provided with a guard time D respectively.

At the time $T_1$, since the traffic is small, there are idle channels among allocated ones. But at the time $T_2$, the traffic becomes too large to be processed unless channels are reallocated. For instance, as shown in FIG. 5, the burst from the ground station $1_{n-1}$ is elongated by shortening the burst from the ground station $1_n$ which has some idle frames. In this manner channels are constantly reallocated in order to maximize the efficiency in processing calls which are constantly originated.

In this prior art system, a time switch is fixedly connected from the time a call is originated to the time it is cleared. More particularly, in FIG. 4 data are controlled by a counter 7 aboard the satellite in a manner so as to be sequentially written in the time switch 6 and read out by the control of the switching controller 8. The data in the switch controller 8 are not changed from the origination of a call until the clearance thereof.

In order to reallocate channels in the prior art, it is thus necessary to provide a channel transfer circuit 5 in the preceding satge of the time switch 6 so that the input channel members at the time switch 6 would not be changed even if the channels in the uplink U are reallocated.

FIG. 6 is a structural view of a prior art channel transfer circuit 5. More specifically, two channel transfer memories $15_1$, $15_2$ are provided for each dataway to store data of one frame, and signals are written in either of the channel transfer memories $15_1$, $15_2$ in the order of arrival and read out in accordance with the control provided by read out controllers $17_1$ and $17_2$ to transfer necessary channels. The reason why two channel transfer memories are needed is to avoid writing new data on other data which has not been completely read out immediately after a change of burst allocation in the uplink U.

The prior art system shown in FIGS. 4 through 6 thus needs a memory for two signal frames transmitted in the uplink U and a memory for one signal frame in the time switch at the channel transfer circuit of each dataway. The hardware to be carried on a satellite inevitably becomes bulkier and larger.

An object of this invention is to reduce the volume of hardware which is required for reallocation of channels.

Another object of this invention is to reduce the volume of hardware of the device aboard a satellite.

Still another object of this invention is to reduce the number of memories inside a switch in order to minimize signal delays.

SUMMARY OF THE INVENTION

This invention relates to a time division switching system capable of reallocation of channels which is characterized by a structure comprising a time switch which can store one frame of data on a time division multiple transmission link, two address control memories at incoming and outgoing sides of the switch capable of storing channel transfer control data on the time division multiple transmission link, and two channel transfer memories capable of storing the control data of the time switch.

With such a structure, the system can write in one frame of incoming data in the time switch and read out the same in accordance with the channel transfer control data. Since the system can control the data of the next frame to be written in the address of the time switch which has just been read out, even if the channel in use is switched from one to another, a memory capable of storing one frame of data would suffice. The system instead requires two each of memories which respectively store channel transfer control data and time switch control data. In case of satellite communication, since the bit number of these control data is extremely small compared with that of the data, the hardware volume in the whole system can be minimized.

At the normal state where there is no change needed for channels used in the time division multiple transmission link, the control address of one of the address control memories is given to the channel transfer memory. One of the channel transfer memories controls the time switch while the other one is set with switch control data for the next frame. These two channel transfer memories alternate the above functions for each frame. Data is read out from the time switch in accordance with the control of the channel transfer memory which is controlling the time switch, then data for the next frame is written in the same address from which data has just been read out. This controlling operation is conducted for each channel. The switch control data which has been read out from a channel control memory is sent to the other channel transfer memory which is preparing the switch control data for the next frame and set at the address of the channel transfer memory which has been prepared by the address control memory.

In order to change the channel for use in the time division multiple transmission link, a new allocation of channels is set at another address control memory to replace by switching the other address control memory which has been used up to the time the channels are reallocated. The control at the normal state will be conducted thereon.

DETAILED DESCRIPTION OF THE PREFERRED EMBODIMENTS

This invention will now be described referring to preferred embodiments thereof shown in the attached drawings.

Figure 1:
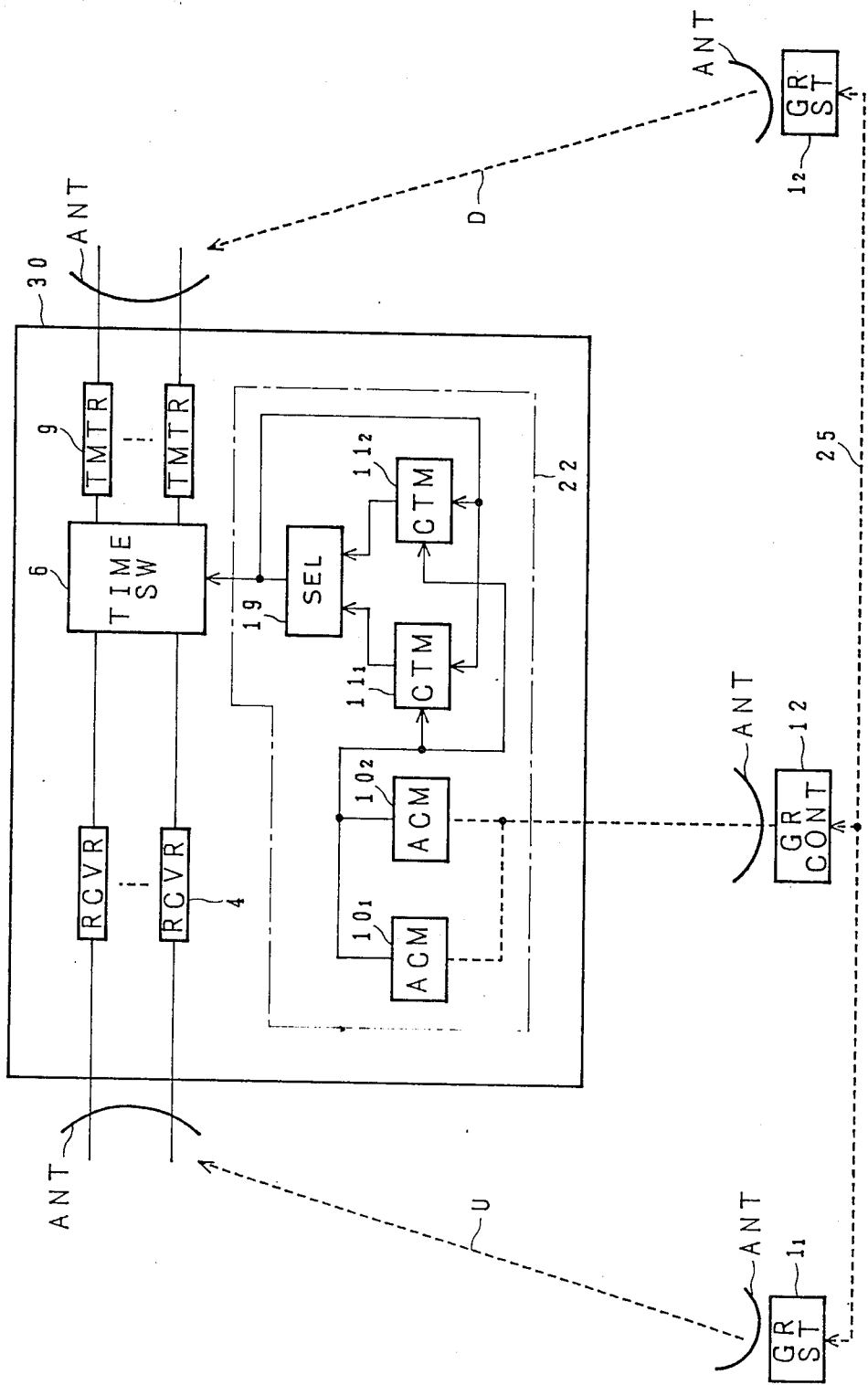
FIG. 1 is a block diagram of an embodiment of the system according to this invention.

FIG. 1 is a block diagram of this invention when applied to a time division switching system aboard a satellite. A plurality of ground stations $1_1$, $1_2$ (for simplicity, only two stations are shown in the figure) and a ground control station 12 are located on the earth. Ground stations $1_1$, $1_2$ and the ground control station 12 are connected with a terrestrial common channel signal network 25. The network 25 is to transfer control signals and may be a wire line, a radio channel or a satellite transmission link.

A satellite 30 carries receivers 4 which demodulate signals received by an antenna, a time switch 6 which receives as input the output of receivers 4, transmitters 9 which modulate the outgoing signal with the output from the time switch 6 and an antenna which transmits the signal to the ground stations. The time switch 6 includes a memory which can store one frame of signals formed by multiplexing plural uplinks U. It also includes a control circuit 22 for controlling the time switch 6. The circuit 22 comprises two address control memories $10_1$, $10_2$, two channel transfer memories $11_1$, $11_2$, and a selector 19. The address control memories $10_1$, $10_2$ are controlled by the ground control station 12, and the outputs thereof are supplied to the two channel transfer memories $11_1$, $11_2$. One of the outputs from the two channel transfer memories $11_1$, $11_2$ is selected by the selector 19 to be sent to the time switch 6 as a control signal.

This system is characterized by its structure wherein the memory of the time switch 6 suffices so long as it stores one frame of data transmitted via each uplink U, and the system includes two address control memories $10_1$, $10_2$ and two channel transfer memories $11_1$, $11_2$, thereby eliminating the need for the channel transfer circuit 5 which was heretofore required.

This system is controlled by switching according to the following procedure. A call originating signal is sent from a ground station $1_1$ to a ground control station 12 via the terrestrial common network 25. The ground control station 12 searches for an idle channel in the uplink U and the downlink D, and it sends their channel data to the satellite 30 to set them at the address control memory $10_1$.

Controlling of write-in/read-out at the time switch 6 is conducted alternately by the channel transfer memories $11_1$ and $11_2$ for each frame. For example, while the channel transfer memory $11_1$ is controlling the write-in/read-out at the time switch 6, the time switch control data for the next frame is set at the other channel transfer memory $11_2$. The control is performed with the control data from the address control memory $10_1$ and the address control data read out from the channel transfer memory $11_1$.

When the channels are reallocated, the data for change is prepared at the ground control station 12 and is written in the address control memory $10_2$ on the satellite 30 which is not in use. When a channel reallocation again needs the address control memory $10_1$, which is then not in use, data is written in containing the data for change.

Figure 2:
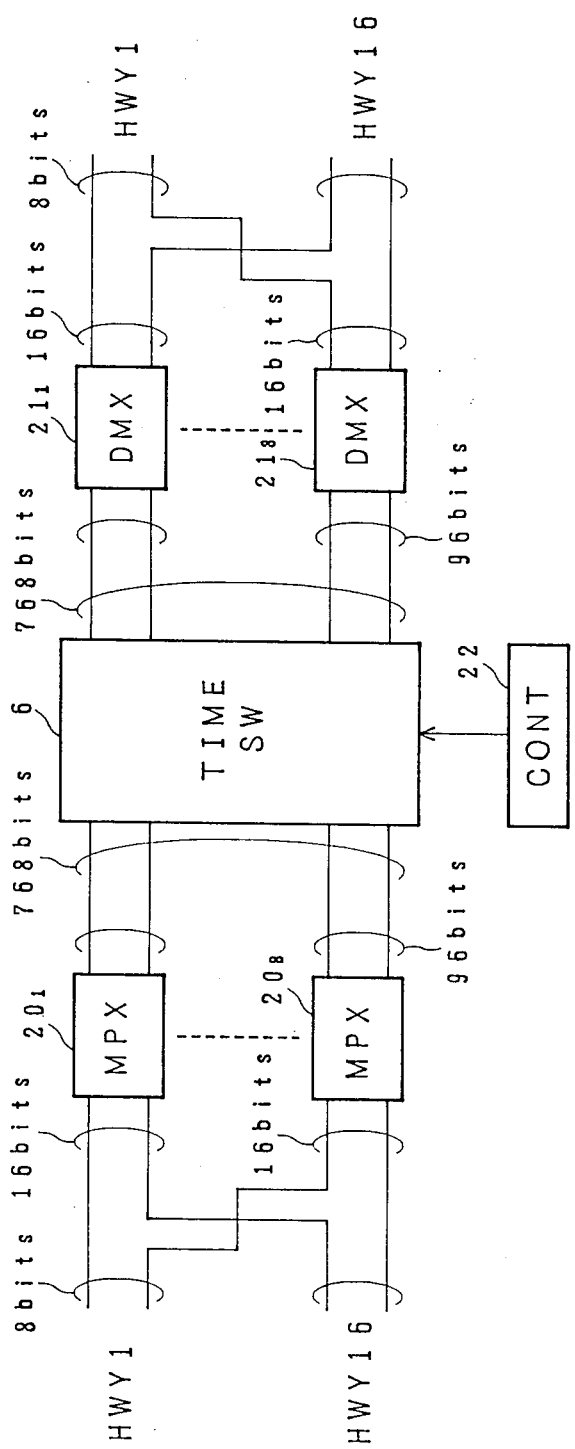
FIG. 2 is a block diagram of the embodiment of this invention at portions near a time switch thereof.

FIG. 2 is a structural view of the time switch 6 and its peripheral devices of the embodiment of this invention. If it is assumed that a frame of the uplink U is so structured with 12 mS frames, 768 channel multiplex and 768 bits/channel with a dataway speed of about 50 Mb/S, the data is demodulated to a base band signal by the receivers 4, the preamble P is removed containing data for synchronization control, and the data is converted into a continuous signal and changed into a parallel signal of 8 bits/dataway (HWY). It is inputted at the multiplexing circuits $20_1$ through $20_8$. The data of each dataway are multiplexed to conduct switching in the unit of a channel by the time switch 6. The data switched by the time switch 6 is separated for each dataway at separators $21_1$ through $21_8$ and transmitted to the ground station $1_2$ via the transmitter 9.

Figure 3:
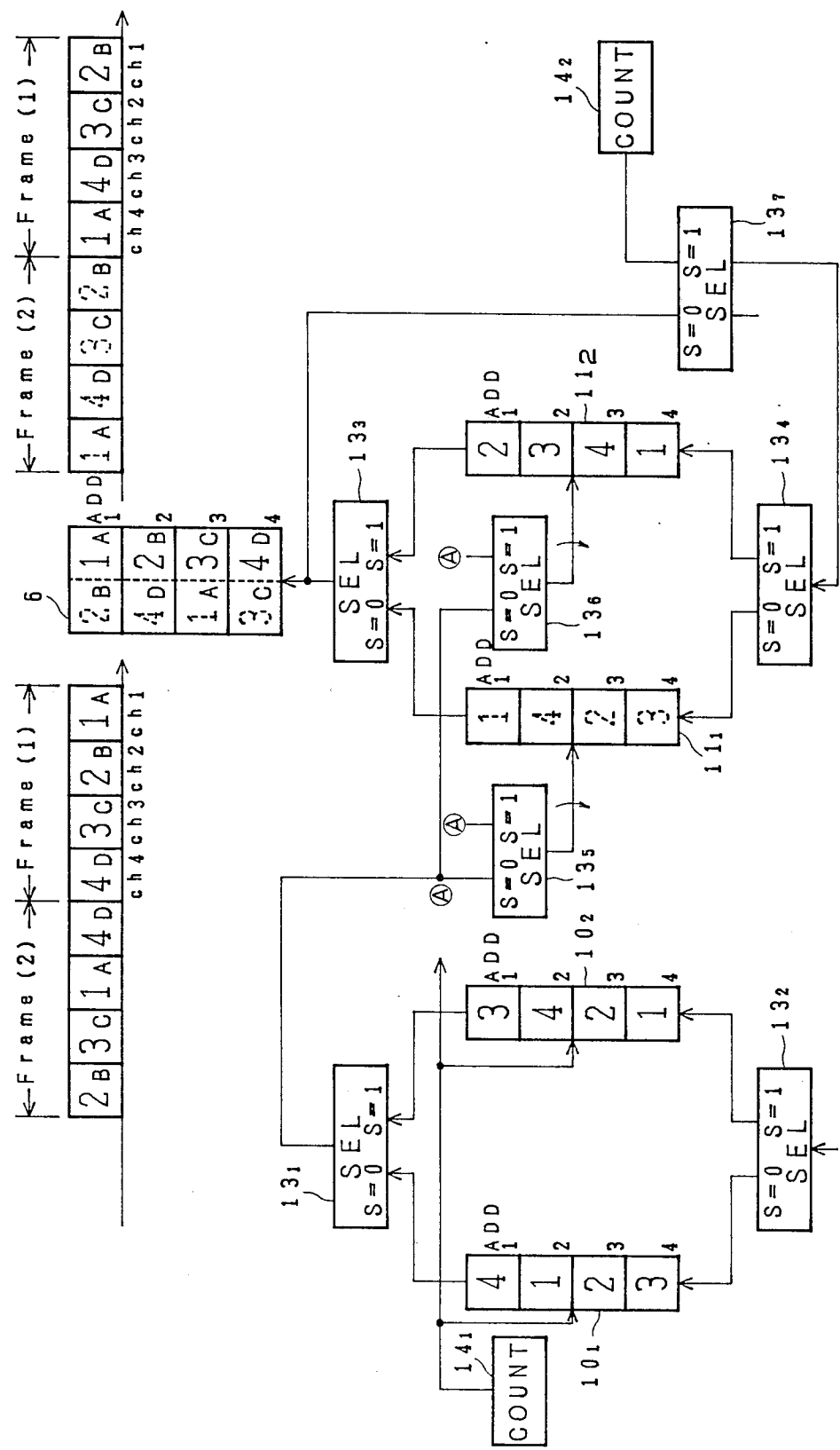
FIG. 3 is an explanatory view of the basic switching principle according to this invention.
Figure 4:
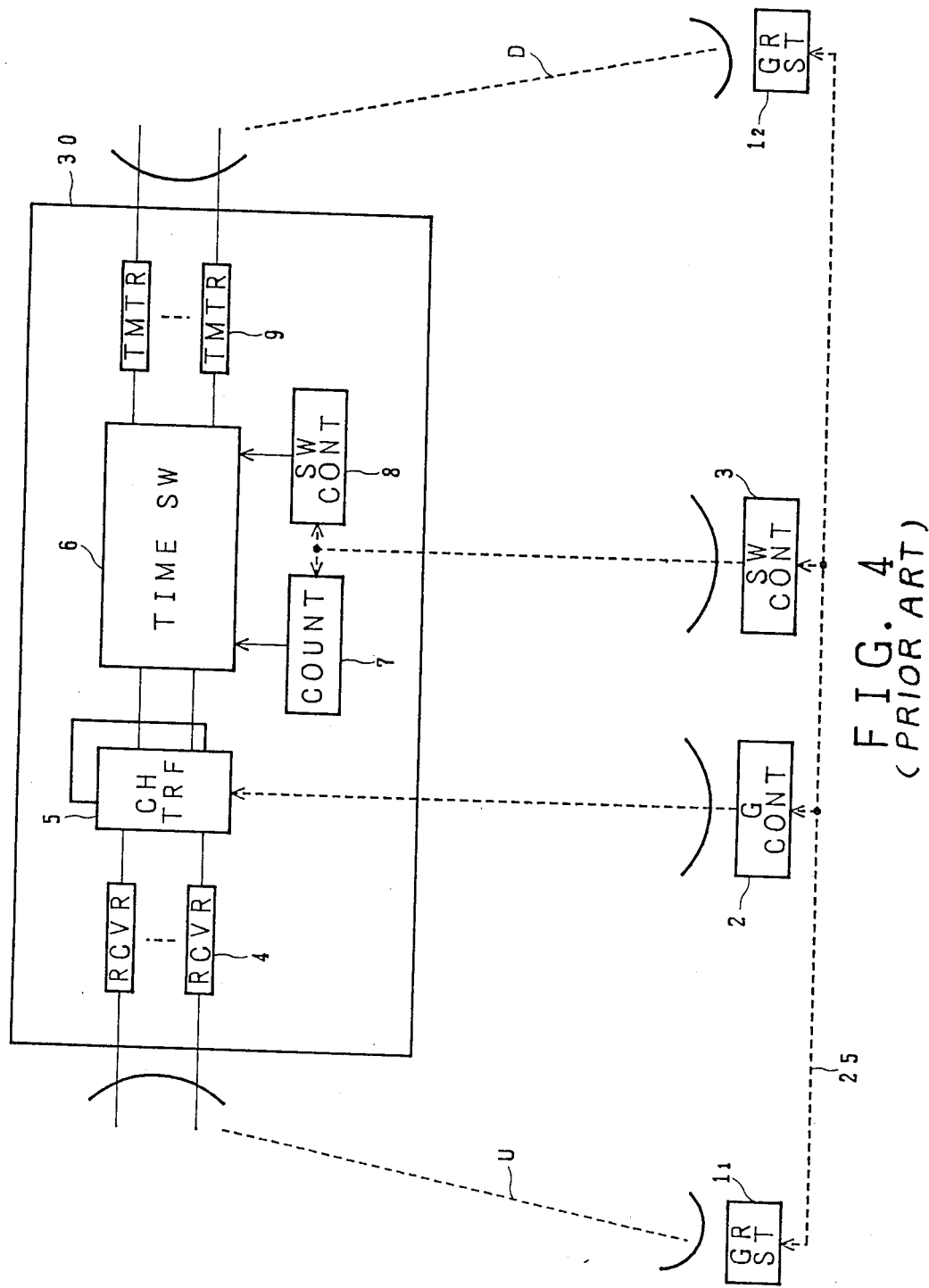
FIG. 4 is a block diagram of a prior art system.
Figure 5:
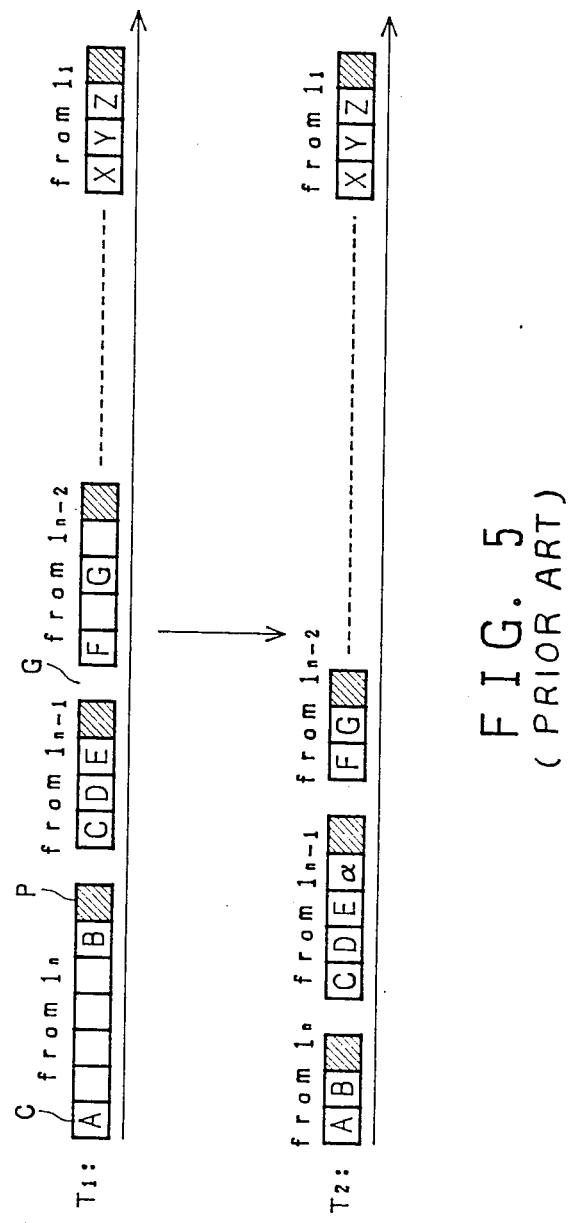
FIG. 5 is an explanatory view of reallocation of channels.
Figure 6:
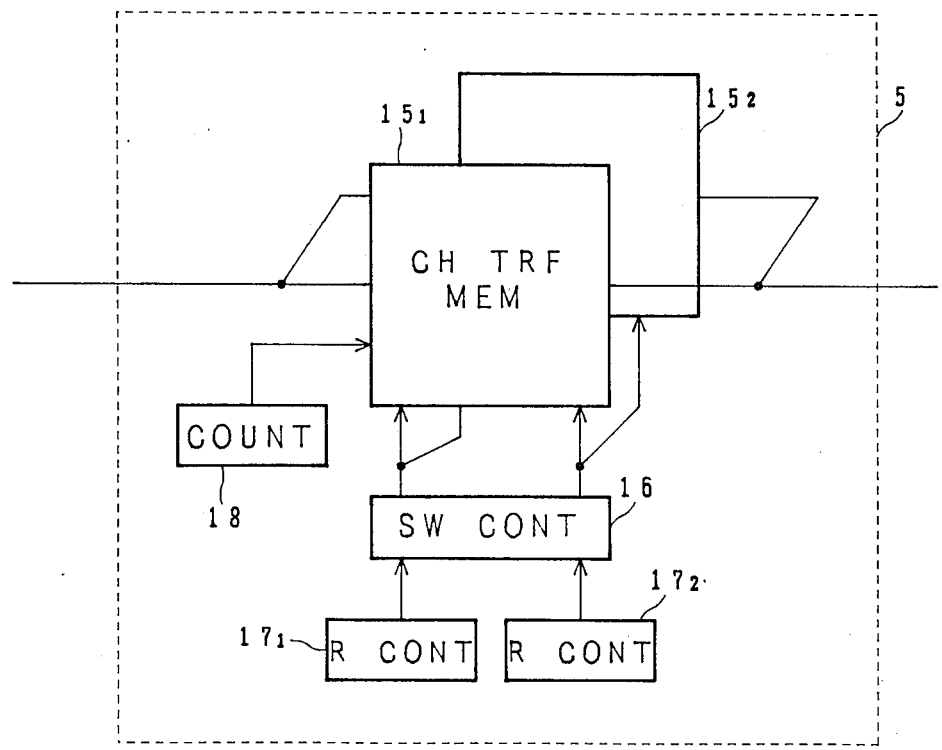
FIG. 6 is a block diagram of the channel transfer circuit required for the prior art system.
Figure 7A:
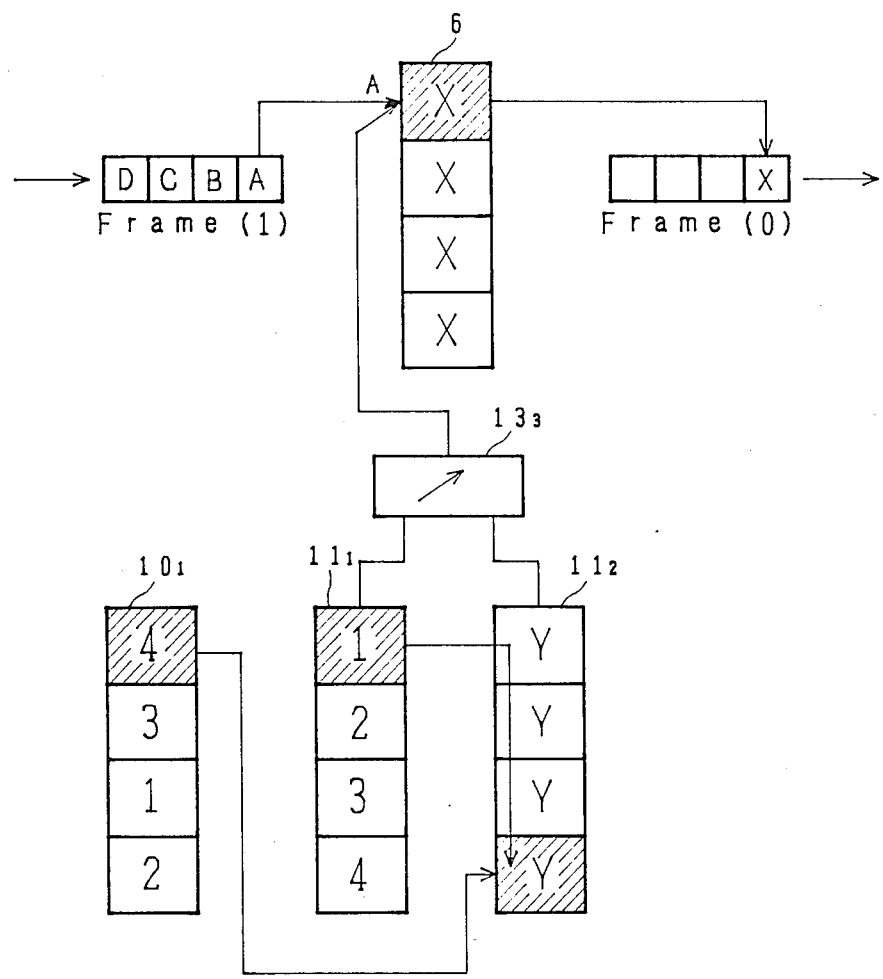
FIGS. 7A through 7H are explanatory views of chronological changes in memories when there is no change in channel allocation according to this invention.
Figure 7B:
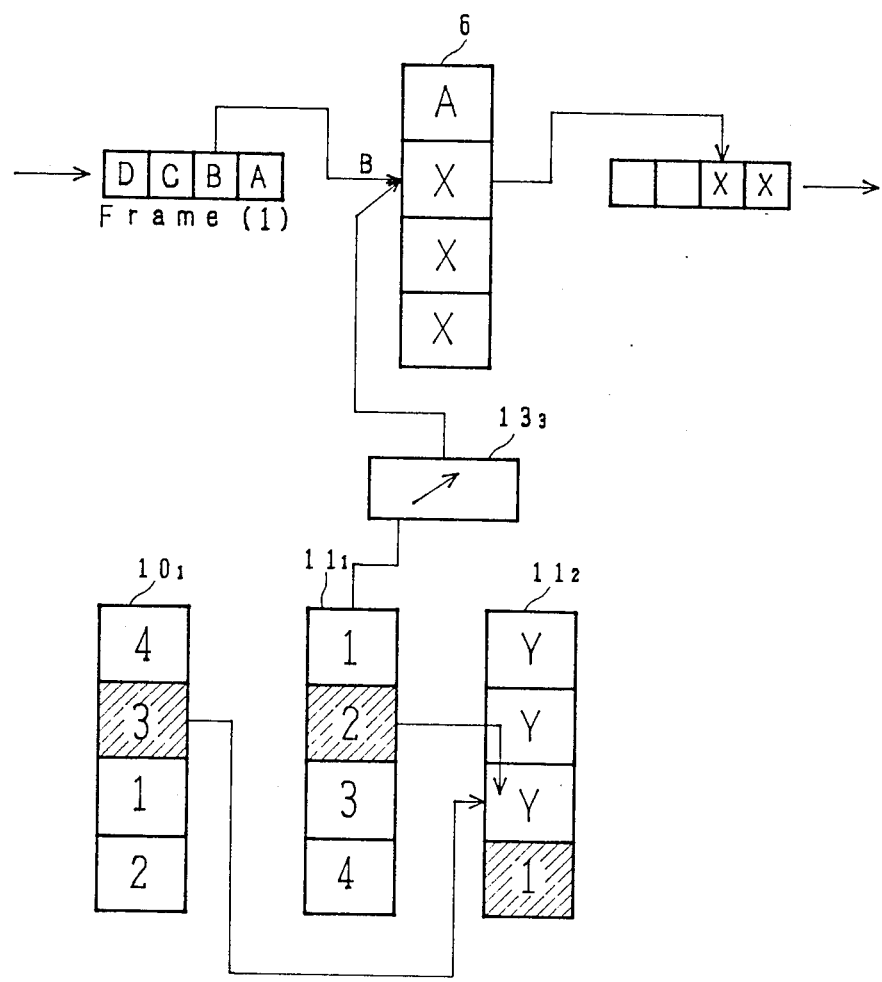
Figure 7C:
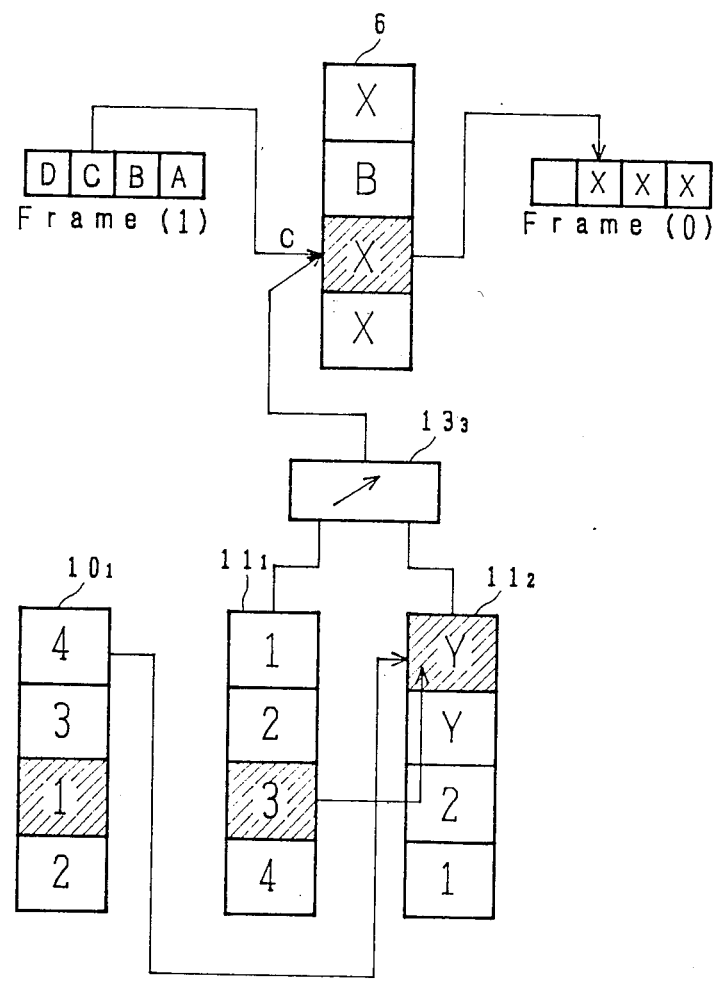
Figure 7D:
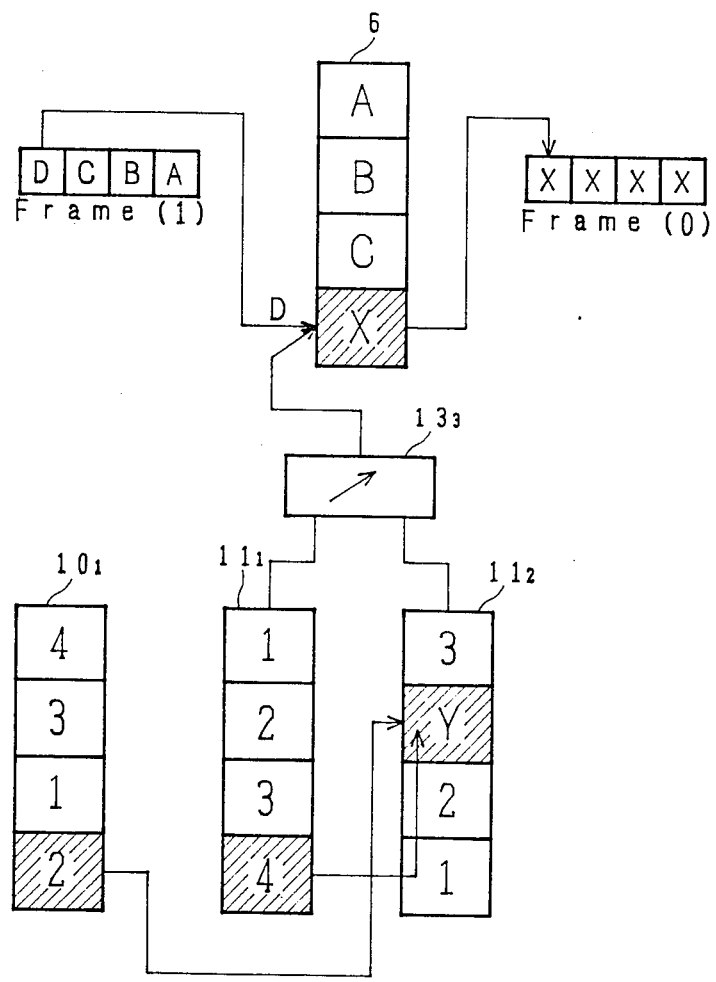
Figure 7E:
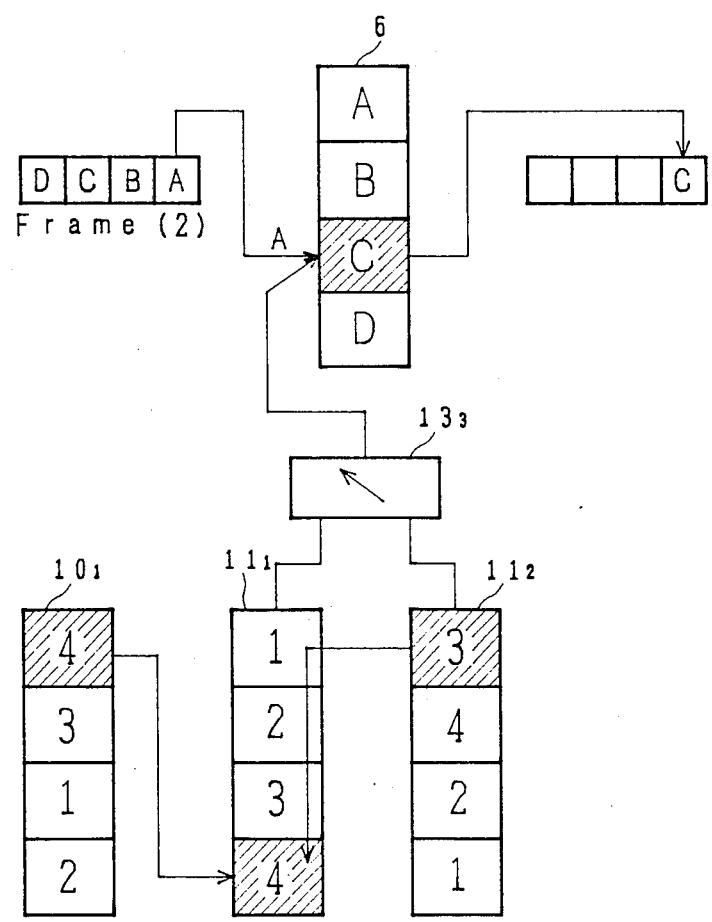
Figure 7F:
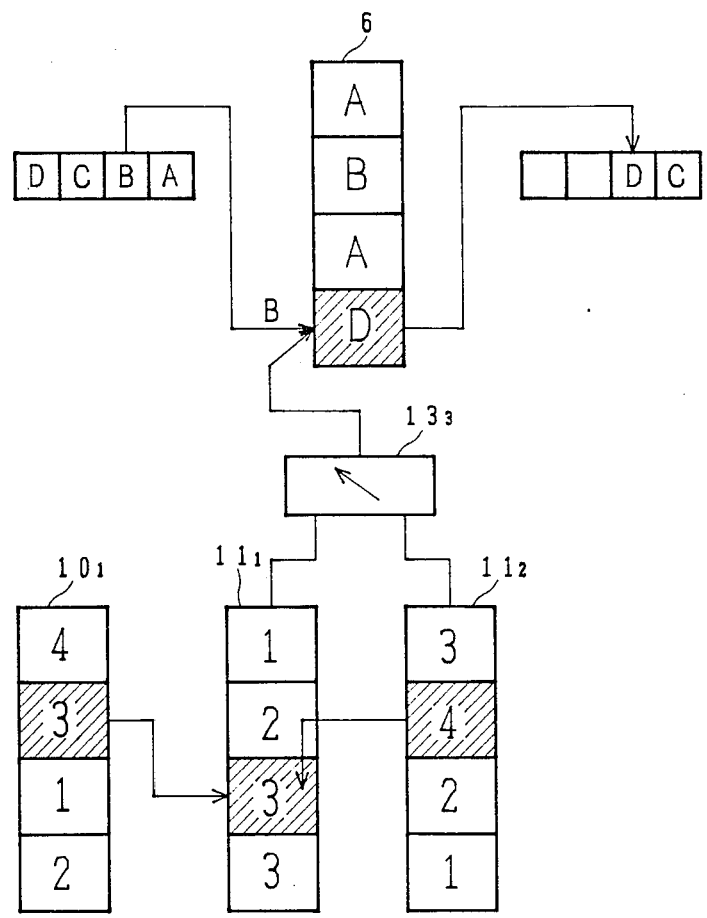
Figure 7G:
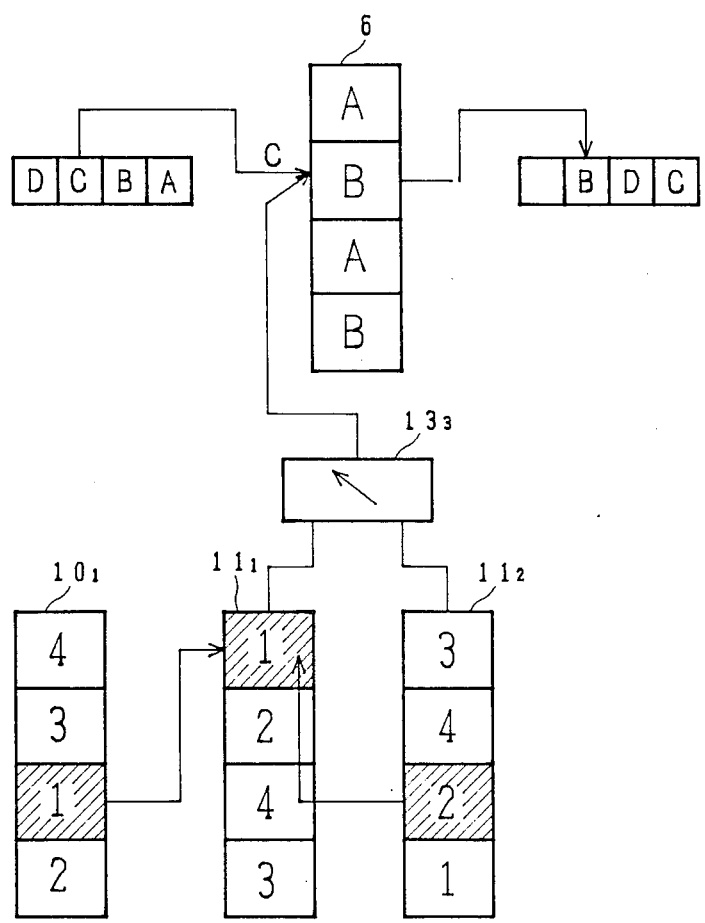
Figure 7H:
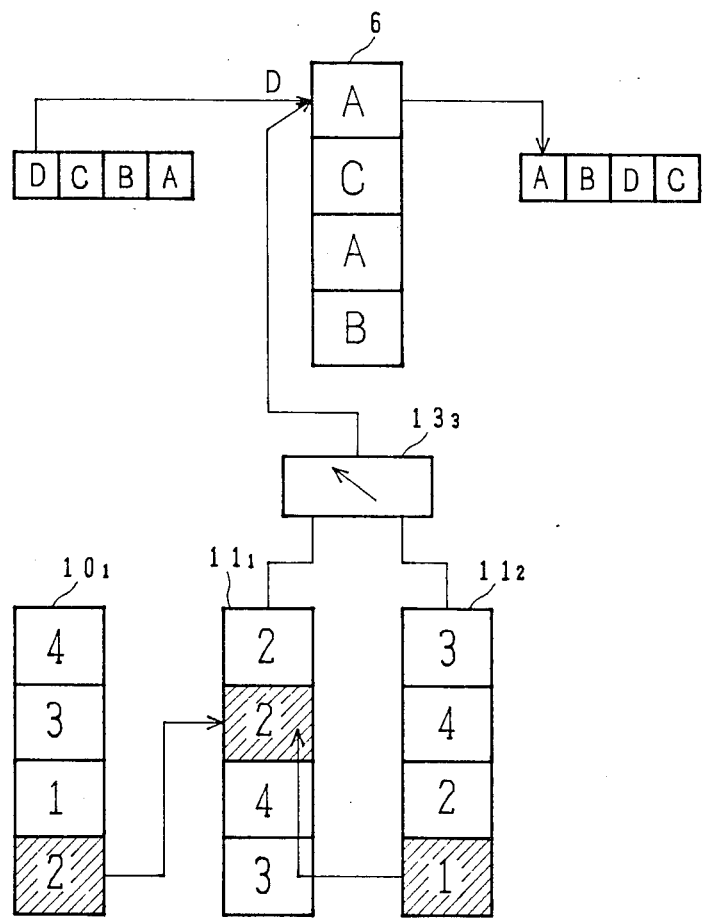

FIG. 3 is an explanatory view to describe the switching principle of the time division switching system of this invention. To simplify the description, the number of the channels multiplexed by the multiplexing circuits $20_1$ through $20_8$ in FIG. 2 is assumed to be four.

In the input dataway of the time switch 6, the data in the first through the fourth channels of the frame (1) are denoted with A, B, C and D. It is assumed that the data A is switched by the time switch 6 to the fourth channel on the outgoing side. Similarly, the data B, C and D are switched respectively to the first, second and third channels. The memory of the time switch 6 stores the amount of data equivalent to one frame or four channels. The memory illustrated in the right column of time switch 6 in FIG. 3 shows the state where the data A, B, C and D of the frame (1) have been written in while those B, D, A and C illustrated at the left column show the state where the data of the frame (2) have been written in.

The control data is set at the address control memory $10_1$ in the following manner. The address [4] of the channel transfer memory $11_2$ is written in the address 1 of the address control memory $10_1$. Similarly, the addresses [1], [2], [3] of the address control memory $11_2$ are written in the addresses 2, 3 and 4 of the address control memory $10_1$. The address control memories $10_1$ and $10_2$ sequentially read out the control data of the addresses 1 through 4 in synchronization with the writing-in operation of the data A through D at the time switch 6 and output the control addresses of the channel transfer memories $11_1$, $11_2$.

The time switch 6 has been written into with the data A, B, C and D of the frame (1) sequentially. More particularly, the data A is written in the address 1 of the time switch 6. Similarly, the data B through D are written in the addresses 2 through 4. In parallel thereto, the address control data [4123] of the channel transfer memory $11_2$ are outputted from the address 1, 2, 3 and 4 of the address control memory $10_1$ to be supplied to the channel transfer memory $11_2$. The control data of the time switch 6 which is being written in the channel transfer memory $11_2$ is the data outputted from a counter $14_2$ (only at the time of initialization). Therefore, the read out address [2341] of the time switch 6 are written in the addresses 1 through 4 of the channel transfer memory $11_2$. This switches the data ABCD to BCDA on the output side.

In the next frame or the frame (2) in FIG. 3, the data for change should be set at the address control memory $10_2$ in advance in order to change the frame structure of the uplink U. After setting and at the time when the data of the frame (2) is being written in the time switch 6, the address control memory $10_1$ which has been outputting the control address of the channel transfer memory $11_2$ up to then is switched to the address control memory $10_2$. From which frame the channel allocation should be changed is determined by the data such as that provided in the control channel at the top of each frame to set a frame change timer. The change data for the frame structure of the uplink U is the control data for use of the first channel of the data D, the data A for use of the second channel, the data C for use of the third channel, and the data B for use of the fourth channel. It is assumed that the channel allocation of the downlink D is not to be changed.

When the data D of the fourth channel of the frame (1) is written in the address 4 of the time switch 6, the control data [2] of the address 1 of the channel transfer memory $11_2$ is supplied to the time switch 6, and then the data of the address 2 of the time switch 6 is read out (at the time point $T_1$). This is a read cycle. Subsequently, the data D of the first channel of the frame (2) is written by the same control data [2] in the address 2 of the time switch 6. This is a write cycle. Between the read cycle and the write cycle, the control data of the first channel of the frame (2) is set at the channel transfer memory $11_1$. More specifically, the output data [2] from the channel transfer memory $11_2$ is written in the channel transfer memory $11_1$.

When the switch control address [2] is set at the channel transfer memory $11_1$, the place it should be set is the address [3] thereof which has been written in the address 1 of the address control memory $10_2$. Similarly, the control addresses [1], [4], [3] of the time switch 6 are set at the addresses [1], [2] and [4] of the channel transfer memory $11_1$.

FIGS. 7A through 7H show the contents in the chronological order of the time switch 6, address control memory $10_1$, and channel transfer memories $11_1$, $11_2$. In the figures, the states of chronological changes for channels are illustrated in the alphabetical order, A–H, and the region accessed at each time point is indicated with hatched lines. By following FIGS. 7A through 7H in order, the changes in each memory can be understood. The states shown are the ones where no change in the channel allocation is made. If there is a change in channel allocation, a new allocation of channels is set at the other address control memory $10_2$ as described above (which is not shown in FIG. 7) to be used by switching to this memory.

Figure 8:
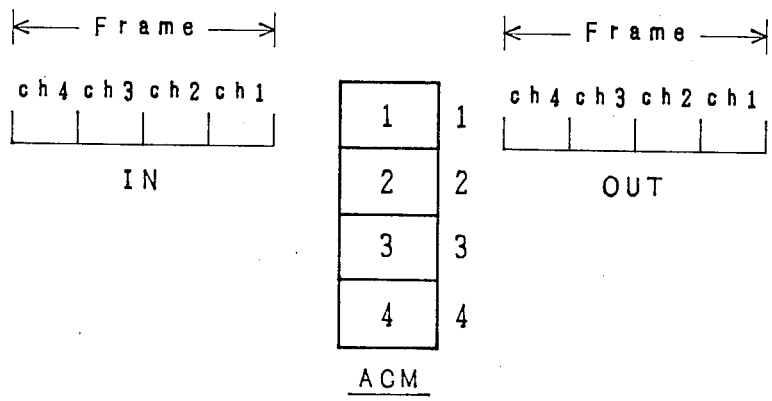
FIG. 8 is an explanatory view of the contents of respective memories showing the initial set and channel connection for an address control memory.
Figure 8:
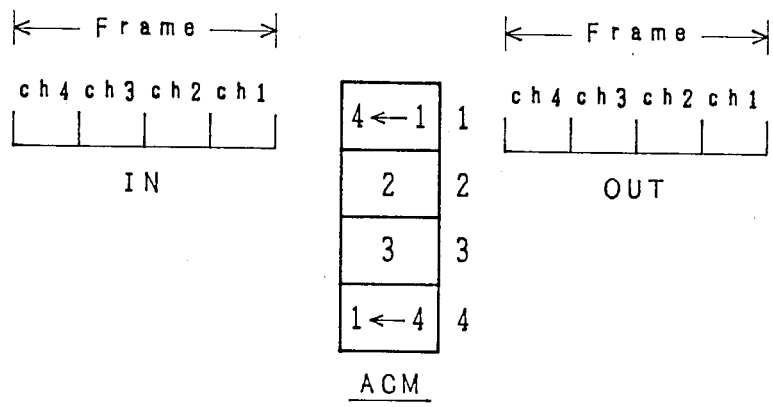

The method of setting an address control memory is described referring to FIG. 8. FIG. 8(1) is a view at initialization. The sequential address is set at each address of the address control memory. In this case, the address value is identical with the data value. FIG. 8(2) shows the condition starting from the initialization to the state where a ground station $1_1$ originates a call and is connected. In the first channel, ch1, on the incoming side, a frame transmitted from the ground station exists as data A. The data A is going to be transferred to the fourth channel ch4 on the outgoing side frame in this embodiment. The data [1] of the address [1] of the address control memory is transferred to [4] and the data of the address [4] of the address transfer memory which has the same value as the channel number [4] of the output dataway which it is to be switched with is set at [1].

As in the time switch 6 after the data of one channel has been read out, the data of the next frame is written in the same address, for even if the channels should be reallocated, the system does not need an additional channel transfer circuit like the prior art system. More particularly, according to this invention, the memory required for one dataway data is as small as one frame to thereby reduce the memory which temporarily stores data into one third of that of the prior art.

INDUSTRIAL APPLICATION

This invention needs only a time switch for temporarily storing data which are passing through a time division switch, and it does not need any channel transfer circuit, thereby shortening the delay time of signals to approximately one half.

This invention can be changed in channel allocation simply by modifying the contents of the address transfer memories, and the time switch thereof can be controlled automatically from ground in accordance with the channel transfer memories to thereby simplify the ground control.

This invention is advantageous in respect of hardware amount when it is applied to a time division switch aboard a satellite. If the frame is structured with 12 mS, a dataway bit rate of about 50 Mb/S, 768 channel/dataway, and the dataway in the time switch 6 has 16 bits, the number of LSI in the time switch 6 required for storing data is 72. LSI used herein is assumed to be a random access memory of 128k bits. An address control memory can be constructed with four LSIs, and a channel transfer memory with four LSIs, a total of eight LSIs.

In the prior art system, a channel transfer circuit 5 must be provided in a preceding stage of the time switch 6 which required the memory capacity to be twice as great as that of the time switch 6. If all the other conditions are the same as above, the number of LSIs required for the channel transfer circuit 5 alone will be 144. The number of LSIs required for this invention's control circuit is thus negligible compared to those required by the prior art. This invention can remarkably reduce the volume of hardware into almost one third as a whole system.

What is claimed is:

1. A time division switching system having a time switch capable of reallocating channels over a time division multiple transmission link, comprising:

a memory which can store data of one frame of incoming signals transmitted over said link to said time switch;

two address control memories which respectively store channel transfer control data on the incoming side of said time switch and transfer control data on the outgoing side of said time switch;

two channel transfer memories which control said time switch; and control means for controlling said channel transfer memories such that said two channel transfer memories are alternately used in accordance with the content of one of said address control memories to read out data from an address of the time switch and to write in data for the next frame in the same address immediately after the reading out, and when channels should be reallocated by said time switch, a new channel allocation is set at the other one of said address control memories and said control means switches from said one to the other address control memory for controlling said channel transfer memories.

2. The time division switching system as claimed in claim 1, wherein the time division switching system is carried on board of a satellite.

* * * * *